US009720893B2

United States Patent
Bisaga et al.

(10) Patent No.: US 9,720,893 B2
(45) Date of Patent: Aug. 1, 2017

(54) AUTOMATED CONTENT INJECTION

(71) Applicant: Pearson Education, Inc., Upper Saddle River, NJ (US)

(72) Inventors: Gary J. Bisaga, Leesburg, VA (US); Jeffrey S. Huffman, Folsom, CA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 83 days.

(21) Appl. No.: 14/667,519

(22) Filed: Mar. 24, 2015

(65) Prior Publication Data

US 2015/0278177 A1 Oct. 1, 2015

Related U.S. Application Data

(60) Provisional application No. 61/970,086, filed on Mar. 25, 2014.

(51) Int. Cl.
  *G06F 17/00* (2006.01)
  *G06F 17/24* (2006.01)
  *G06F 17/30* (2006.01)

(52) U.S. Cl.
  CPC ........... *G06F 17/24* (2013.01); *G06F 17/241* (2013.01); *G06F 17/30011* (2013.01)

(58) Field of Classification Search
  CPC ......................................... G06F 17/20–17/289
  See application file for complete search history.

(56) References Cited

U.S. PATENT DOCUMENTS

| | | | | |
|---|---|---|---|---|
| 7,149,964 B1* | 12/2006 | Cottrille | ............... | G06F 17/2223 704/8 |
| 8,311,875 B1* | 11/2012 | Lloyd | ................ | G06Q 30/0241 705/7.29 |
| 9,514,238 B2* | 12/2016 | Blitzstein | .......... | G06F 17/30905 |
| 2005/0120303 A1* | 6/2005 | Behbehani | ............ | G06F 17/243 715/201 |
| 2005/0160358 A1* | 7/2005 | Gumz | ................. | G06F 9/44526 715/234 |
| 2008/0028292 A1* | 1/2008 | Graham | ............ | G06F 17/30905 715/230 |
| 2009/0100154 A1* | 4/2009 | Stevenson | .............. | G06Q 30/02 709/220 |
| 2011/0219294 A1* | 9/2011 | Leshner | ................ | G06F 17/212 715/234 |
| 2012/0272136 A1* | 10/2012 | Takami | ............. | G06F 17/30867 715/234 |
| 2014/0006925 A1* | 1/2014 | Bassemir | .............. | G06F 17/218 715/234 |

* cited by examiner

*Primary Examiner* — Keith Bloomquist
(74) *Attorney, Agent, or Firm* — Kilpatrick Townsend & Stockton LLP

(57) ABSTRACT

A system and method for automated customization are disclosed herein. The system includes a content distribution network formed of a content network, an end-user network, and one or several customization networks. The end-user network includes a local data server and an end-user server. The end-user server can be programmed to receive a document, identify one or several customizations for insertion into that document; identify one or several insertion points designated to receive the one or several customizations, and to insert the one or several customizations into the designated one or several insertion points.

20 Claims, 11 Drawing Sheets

AUTOMATED CONTENT INJECTION

CROSS-REFERENCES TO RELATED APPLICATIONS

This application claims the benefit of U.S. Provisional Application No. 61/970,086, filed Mar. 25, 2014, and entitled "CONTENT INJECTION," the entirety of which is hereby incorporated by reference herein.

BACKGROUND OF THE INVENTION

This disclosure relates in general to a content modification system and content modification and/or customization. Digital content is becoming increasingly wide-spread and prevalent and many items and functions, that previously did not use digital content, are converting to the use of such digital content.

While the use of digital content and services in the place of older, traditional content and services has many advantages, it also has some disadvantages. These disadvantages can include the higher level of skill required to develop and/or modify the digital content, the infrastructure costs of developing and/or modifying the digital content, and the infrastructure costs associated with hosting the content. In fact, many large consumers of digital content and/or generators and/or modifiers of digital content have large IT groups managing and maintaining the hardware infrastructure that comes with hosting, creating, and/or modifying digital content, and in many cases, hire specialists, including software coders, to generate and/or modify digital content.

These costs and burdens associated with the use and/or modification of digital content prevent the realization of the benefits of digital content. Further, these costs and burdens are experienced in many areas in which accordingly, new systems and methods for the modifying and delivering of digital content are desired.

BRIEF SUMMARY OF THE INVENTION

One aspect of the present disclosure relates to systems and methods of identifying, retrieving, and inserting one or more customizations into a document, which may include software, a webpage, an application, or the like. The document can be created to include one or several insertion points that can be located at any one or several positions in the document. In one example, these insertion points can be located at the header and the footer of at least one page of the document.

When the document is received, the document can be evaluated by, for example, a server or computer, to identify if the document contains insertion points, and the position of the insertion points within the documents. If an insertion point is found within the document, then a search is conducted for a customization for insertion at the insertion point. This customization for insertion at the insertion point can be found based on the use of a naming convention in generating the name of the customization, which name is based, in part, on the document and insertion point of the document into which the customization is inserted. After the customization is found, it can be inserted into the insertion point.

An additional aspect of the present disclosure is the use of the above outlined methods of identifying, retrieving, and inserting one or more customizations into a document to automatically update a document. At present, documents, such as the software of a content management system CMS, a learning management system (LMS), student information system (SIS), or the like is customized by institutional users, such as schools, school districts, universities, and the like. However, when a new version of the document is released, these customizations are manually re-applied to the new version of the document. This manual re-application of customizations is tedious and resource intense. Accordingly, in many instances, institutional users elect not to update their document (software) to the newest version. This can lead to many problems arising in the operation of the software, as well as difficulties in providing customer service to these institutional users because of the many different versions of the software (document) used.

Applying the methods discussed above, the document can automatically self-update when a new version is released. This automatic self-update can include the steps of identifying customizations to a first document and/or first version of the document; receiving a second document, and inserting those identified customizations into the second document according to the above-, and below-outlined steps.

One aspect of the present disclosure relates to a method of injecting content into a document. The method includes retrieving a document including digital content via a communication network, determining the existence of at least one insertion point within the document, which determining the existence of the at least one insertion point within the document includes receiving data identifying one or several indicators of an insertion point, and searching the document via a search engine for indicators of the insertion point, and identifying a customization, which customization can include a metadata file, a customization file, and a customization name. In some embodiments the method can include parsing the customization name, determining the customization location, which determining the customization location can include: identifying a designated insertion point for receiving the customization, and identifying a destination location for the customization, which destination location is the location at which the customization appears to a user accessing the document. The method can include inserting the customization into the document at the insertion point, and outputting the document including the inserted customization to a user via a display.

In some embodiments of the method, receiving data identifying one or several indicators of the insertion point can include receiving an electrical signal containing information identifying coding creating an insertion point, which electrical signal is received at an end-user server of an end-user network from a content network. In some embodiments, determining the existence of the at least one insertion point within the document can include associating a first Boolean value indicative of having found at least one insertion point in the document if the search engine identifies coding creating at least one insertion point within the document, and associating a second Boolean value indicative of not having found at least one insertion point in the document if the search engine does not identify coding creating at least one insertion point.

In some embodiments, the method can include searching for a customization. Searching for the customization can include retrieving data identifying a plurality of customization repositories, at least one of which customization repositories is part of the end-user network and at least one of which customization repositories is outside of the end-user network, but communicatively connected with the end-user network. Searching for the customization can include retrieving customization rules, which customization rules identify categories of customizations applicable to the document.

In some embodiments, searching for the customization includes generating and sending a customization request. Generating and sending a customization request can include generating a portion of a customization name according to a naming convention, which portion of the customization name identifies customization for the document. In some embodiments, generating a portion of the customization name includes: retrieving a naming convention from a convention database, retrieving information relating to the document for use in generating the portion of the customization name, and applying the naming convention to the information for use in generating the portion of the customization name to generate the portion of the customization name. In some embodiments, the destination location is within the insertion point, and in some embodiments, the destination location is outside of the insertion point.

One aspect of the present disclosure relates to an end-user system. The end-user system includes a plurality of user devices, each of which plurality of user devices can display a document to a user, and a local data server having a plurality of databases. In some embodiments, the plurality of databases include: a post database, which post database contains the content that is displayed to a user via at least one of the user devices, and a customization database, which customization database includes at least one customization including a customization file and a metadata file. The end-user system can include an end-user server programmed to: retrieve a document including digital content via a communication network, and determine the existence of at least one insertion point within the document. In some embodiments, determining the existence of the at least one insertion point within the document can include: receiving data identifying one or several indicators of an insertion point, and searching the document via a search engine for indicators of an insertion point. The end-user server can be further programmed to identify a customization, which customization has a customization name, parse the customization name and determine the customization location. In some embodiments, determining the customization location can include: identifying a designated insertion point for receiving the customization, and identifying a destination location for the customization, which destination location is the location at which the customization appears to a user accessing the document. In some embodiments, the end-user server can be programmed to insert the customization into the document at the insertion point, and output the document including the inserted customization to at least one of the user devices.

In some embodiments of the system, the identified customization is one of the at least one customization in the customization database, and in some embodiments, the identified customization is not one of the at least one customization in the customization database.

In some embodiments of the system, receiving data identifying one or several indicators of the insertion point can include receiving an electrical signal containing information identifying coding creating an insertion point, which electrical signal is received at an end-user server of an end-user network from a content network. In some embodiments, determining the existence of the at least one insertion point further includes associating a first Boolean value indicative of having found at least one insertion point in the document if the search engine identifies coding creating at least one insertion point within the document and associating a second Boolean value indicative of not having found at least one insertion point in the document if the search engine does not identify coding creating at least one insertion point.

In some embodiments, determining the existence of the at least one insertion point can include searching for a customization, which searching for the customization includes retrieving data identifying a plurality of customization repositories, at least one of which customization repositories is part of the end-user network and at least one of which customization repositories is outside of the end-user network but communicatively connected with the end-user network. In some embodiments, searching for the customization includes; retrieving customization rules, which customization rules identify categories of customizations applicable to the document, and generating and sending a customization request.

In some embodiments, generating and sending a customization request includes generating a portion of an expected customization name according to a naming convention, which portion of the expected customization name identifies a customization for the document. In some embodiments, generating a portion of the customization name can include: retrieving a naming convention from a convention database, retrieving information relating to the document for use in generating the portion of the customization name, and applying the naming convention to the information for use in generating the portion of the customization name to generate the portion of the customization name.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
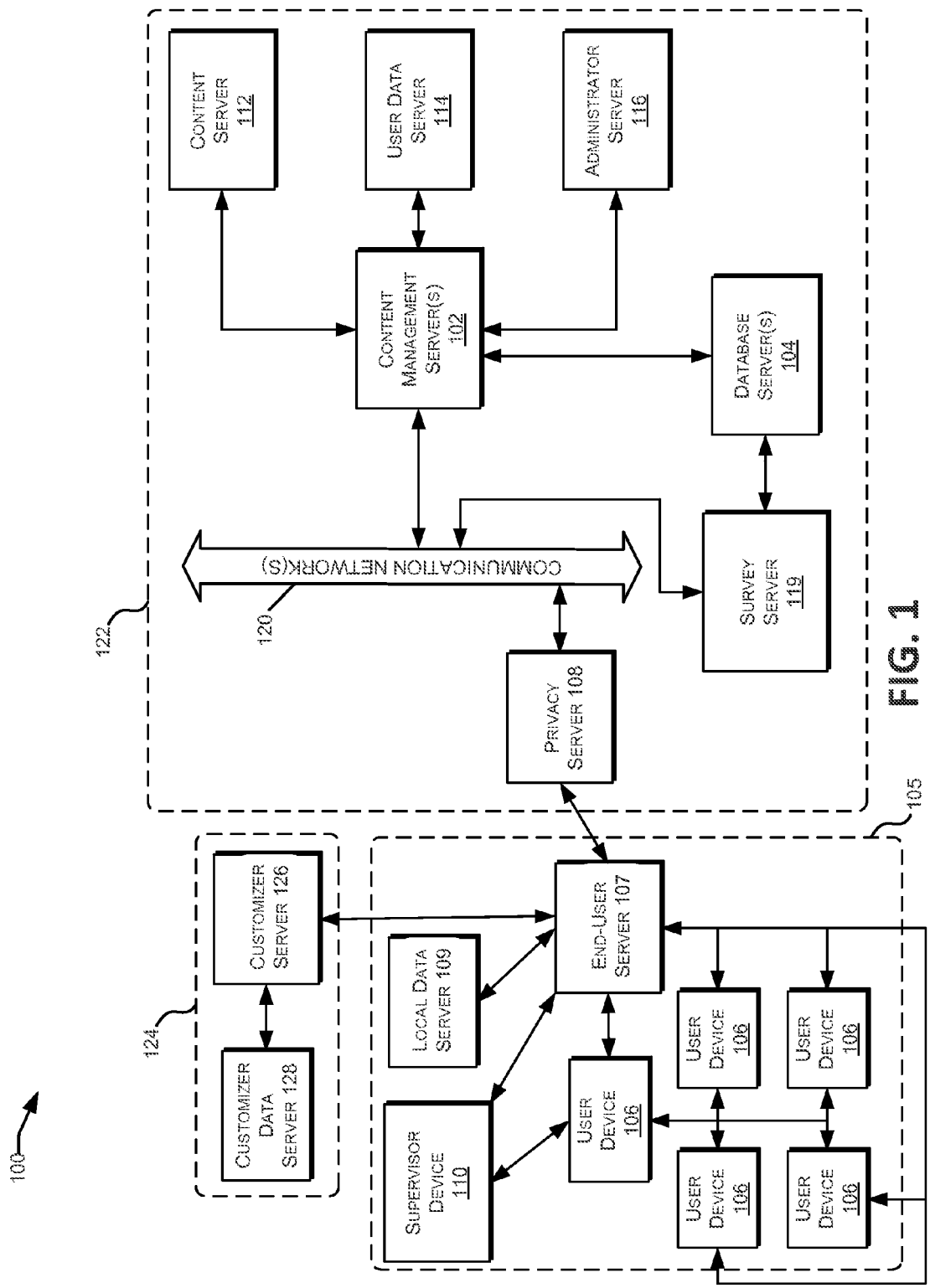
FIG. 1 is a block diagram showing illustrating an example of a content distribution network.

With reference now to FIG. 1, a block diagram is shown illustrating various components of a content distribution network 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more databases servers 104, also referred to herein as databases. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content distribution network 100. Illustrative examples of databases 104 that may be maintained in certain embodiments of the content distribution network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

The content distribution network 100 can include an end-user network 105. The end-user network 105 can be connected with other components of the content distribution network 100 and/or with other networks within the content distribution network 100. The end-user network 105 of the content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The end-user network 105 of the content distribution network 100 can further include one or several end-user servers 107 and/or one or several local data servers 109 and/or local memories. In some embodiments, the one or several end-user servers 107 can be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. End-user server 107 may include one or more server farms, clusters, or any other appropriate arrangement and/or combination or computer servers. End-user server 107 may act according to stored instructions located in a memory subsystem of the End-user server 107, and may run an operating system, including any commercially available server operating system and/or any other operating systems discussed herein.

The end-user server 107 can be configured to receive content from a content network 122, discussed below, and provide that content to the one or several user devices 106. In some embodiments, the end-user server 107 can be further configured to modify the content received from the content network 122 according to one or several modifications that can be stored, for example, in a portion of the content network 122, in a portion of a customizer network 124, and/or within a local data server 109.

The local data server 109 can be a database server similar to database server 104, and can include, for example, some or all of the hardware and/or software components of the database server 104. The local data server 109 can be configured to store and/or can store a local copy of the content received from the content network 122, which local copy can be either modified and/or unmodified. In some embodiments, the local data server 109 can store one or several modifications. In some embodiments, these one or several modifications stored by the local data server 109 can be modifications authored by a user of the end-user network 105 and/or received from another network such as, for example, the content network 122 and/or the customizer network 124. The local data server 109 can be accessed by the end-user server 107 to retrieve content and/or modifications stored on the local data server 109 and/or to provide modified or unmodified versions of the content and/or modifications to the local data server 109 for local storage therein.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include databases of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, databases, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

In some embodiments, some of the components of the content distribution network 100 can belong to the content network 122. The content network 122 can include, for example, the content management server 102, the database server 104, the privacy server 108, the content server 112, the user data server 114, the administrator server 116, and/or the communication network 120. The content network 122 can be the source of content distributed by the content distribution network 100, which content can include, for example, one or several documents and/or applications or programs. These documents and/or applications or programs are digital content. In some embodiments, these one or several documents and/or applications or programs can include, for example, one or several webpages, presentations, papers, videos, charts, graphs, books, written work, figures, images, graphics, recordings, applets, scripts, or the like.

In some embodiments, the content distribution network 100 can include the customizer network 124. The customizer network 124 can be one or several networks of devices separate and/or distinct from one or both of the end-user network 105 and the content network 122 in which one or several modifications are authored and/or created. In some embodiments, the customizer network 124 can be communicatively connected with one or both of the end-user network 105 and the content network 122.

The customizer network 124 can include, for example, a customizer server 126. The customizer server 126 can be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Customizer server 126 may include one or more server farms, clusters, or any other appropriate arrangement and/or combination or computer servers. Customizer server 126 may act according to stored instructions located in a memory subsystem of the Customizer server 126, and may run an operating system, including any commercially available server operating system and/or any other operating systems discussed herein.

The customizer server 126 can be configured to receive one or several modifications from one or several users of the customizer network 124, to store these one or several modifications within a customizer data server 128, and to provide the one or several modifications to one or several end-user networks 105 in response to a request for providing the one or several modifications.

The customizer data server 128 can be a database server similar to database server 104, and can include, for example, some or all of the hardware and/or software components of the database server 104. The customizer data server 128 can be configured to store and/or can store a copy of one or several modifications that can be received from one or several users of the customizer network 124 and/or from the customizer server 126.

Figure 2:
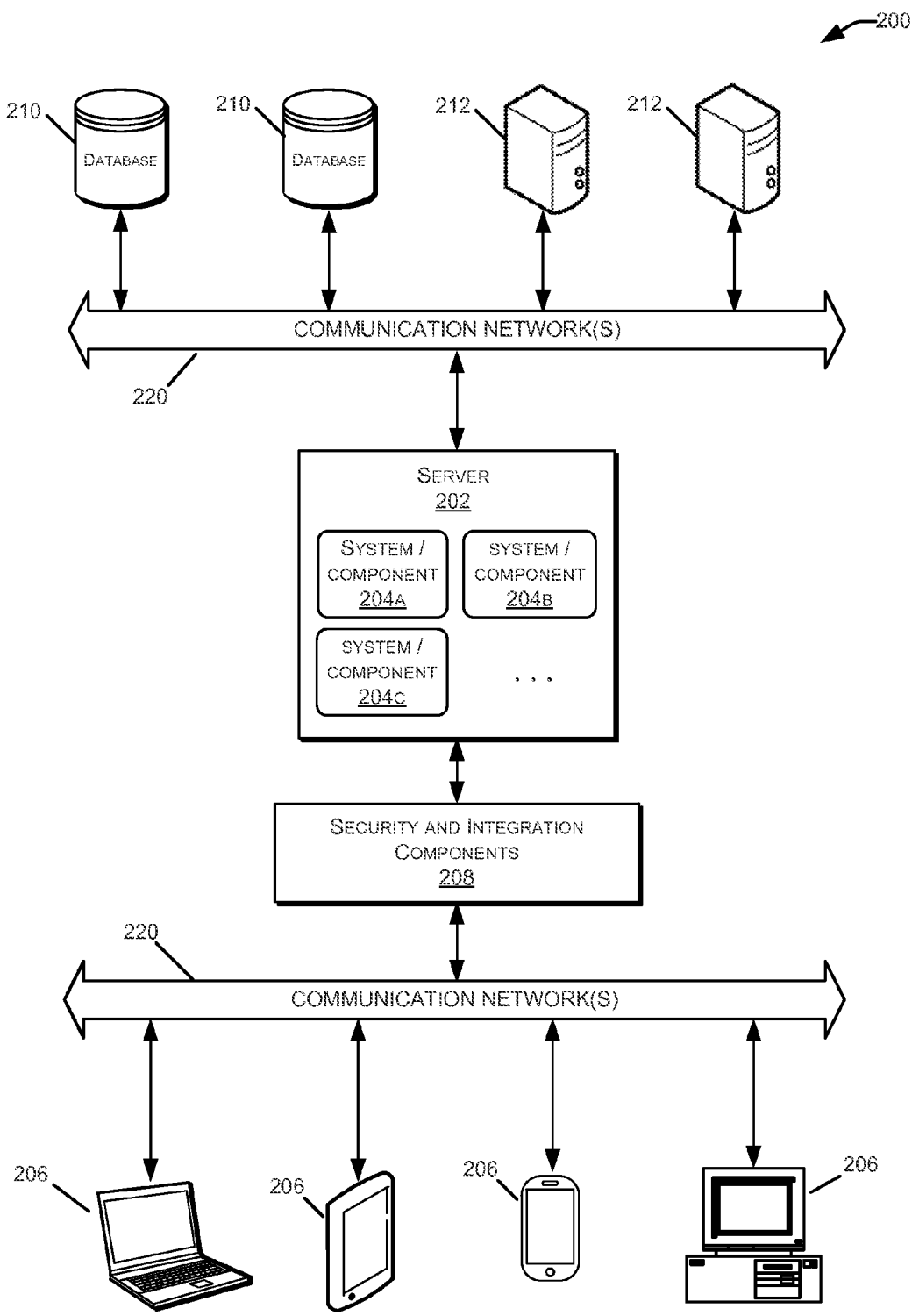
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104, the local data server 109, and/or the customizer data server 128 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN). In some embodiments, the computing environment can be replicated for each of the networks 105, 122, 104 discussed with respect to FIG. 1 above.

Figure 3:
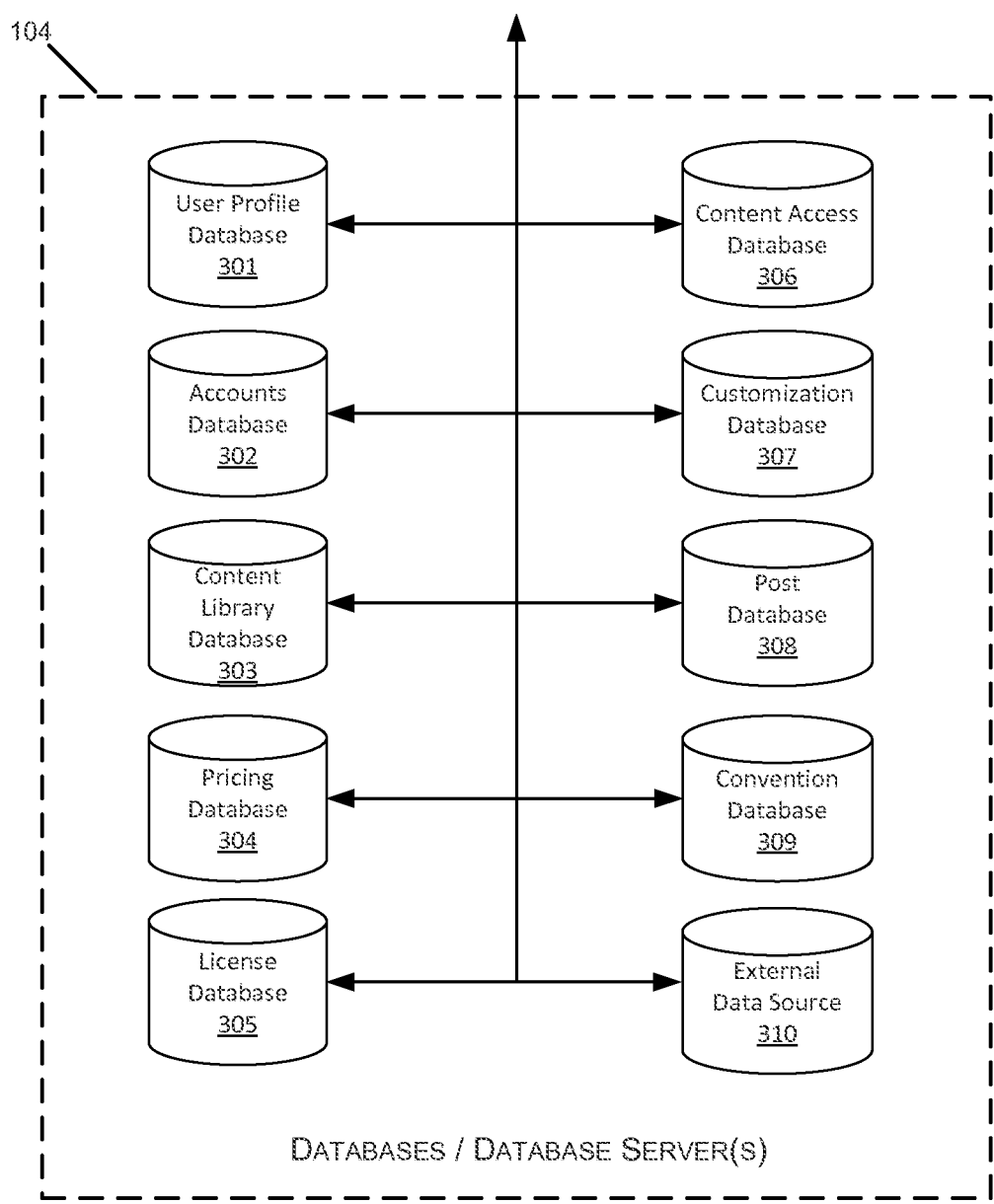
FIG. 3 is a block diagram illustrating an embodiment of one or more database servers within a content distribution network.

With reference to FIG. 3, an illustrative set of databases and/or database servers is shown, corresponding to the databases servers 104 of the content distribution network 100 discussed above in FIG. 1. One or more individual databases 301-310 may reside in storage on a single computer server 104 (or a single server farm or cluster) under the control of a single entity, or may reside on separate servers operated by different entities and/or at remote locations. In some embodiments, databases 301-310 may be accessed by the content management server 102 and/or other devices and servers within the network 100 (e.g., user devices 106, supervisor devices 110, administrator servers 116, etc.). Access to one or more of the databases 301-310 may be limited or denied based on the processes, user credentials, and/or devices attempting to interact with the database.

The paragraphs below describe examples of specific databases that may be implemented within some embodiments of a content distribution network 100. It should be understood that the below descriptions of databases 301-310, including their functionality and types of data stored therein, are illustrative and non-limiting. Database server architecture, design, and the execution of specific databases 301-310 may depend on the context, size, and functional requirements of a content distribution network 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listings of available content titles and descriptions, content title usage statistics, subscriber profiles, account data, payment data, network usage statistics, etc.

A user profile database 301 may include information relating to the end users within the content distribution network 100. This information may include user characteristics such as the user names, access credentials (e.g., logins and passwords), user preferences, and information relating to any previous user interactions within the content of distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content distribution network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content distribution network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content distribution network 100.

An accounts database 302 may generate and store account data for different users in various roles within the content distribution network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library database 303 may include information describing the individual content items (or content resources) available via the content distribution network 100. In some embodiments, the library database 303 may include metadata, properties, and other characteristics associated with the content resources stored in the content server 112. In some embodiments, this data can include the one or several items that can include one or several documents and/or one or several applications or programs. These items can be modified and/or be modifiable by information stored within a customization database 307 discussed below. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the content distribution network 100.

A pricing database 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the users, and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content distribution network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content distribution network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A customization database 307 can include data relating to one or several customizations, which can include, for example, data identifying the content of one or several customizations, and data identifying a location, including a document and location within the document, in which the customization can be placed and/or is intended to be placed. In one embodiment, the data in the customization database 307 can include a customization file that can include, for example, one or several page fragments, and metadata which can be, for example, a metadata file, indicating a location within a document at which the content of the customization file should be added. In some embodiments, the customization file can include the metadata, and in some embodiments, the metadata can be separate from the customization file. In one embodiment, in which the metadata is separate from the customization file, the customization file and the metadata are linked via a naming convention, which naming convention can, for example, include information linking the customization file and the metadata, and indicating the document in which the customization file is intended to be placed. In some embodiments, the naming convention can further provide and/or include information relating to the position in the document at which the customization file is intended to be placed.

In some embodiments, the customization database 307 can further include information relating to the source of the content resources available via the content distribution network 100, and specifically relating to the source of the customizations contained in the customization database 307. For example, this information may identify the authors and originating devices of one or several customizations, the customizer network 124 that is the source of the customization, previous customizations originating from the same authors, originating devices, customizer network 125, and/or the like.

A post database 308 can include information identifying one or several published documents. In some embodiments, these one or several published documents can include one or several of the items from the content library database 303, which items can, in some embodiments, be modified with information from the customization database 307. The documents stored in the post database 308 can be published in any desired fashion that provides the content to one or several intended users, including, for example, publication as, or on, a webpage, publication on-line, printed publication, or the like. In some embodiments, the post database 308 can be stored in, for example, the local data server 109 of the end-user network 105.

A convention database 309 can include information identifying one or several rules or conventions that can be used in determining the document into which content should be placed, and can be used in determining the location in the document at which the content should be placed. In some embodiments, the convention database 309 can include information relating to rules for one or several naming conventions, one or several parsing algorithms to ascertain correspondence between text and the one or several conventions in the convention database 309, or the like.

In some embodiments, the convention database 309 can further include information relating to customizations and/or content available for a user. This information can include, for example, an identification of sources from which content and/or one or several customizations can be retrieved and/or one or several rules relating to use of content and/or customizations. In some embodiments, the sources from which content and/or one or several customizations can be retrieved can include, for example, one or several networks and/or one or several servers located in one or several networks from which content and/or one or several customizations can be retrieved. Examples of such networks include, for example, one or more of the end-user network 105, the content network 122, and/or one or several customizer networks 124.

In some embodiments, the rules relating to use of content and/or customizations can include rules identifying one or several acceptable content and/or customization type, size, format, coding, or the like. These rules can be static in that they do not change based on the location and/or purpose of the customization, and in some embodiments, these rules can be dynamic in that they change based on the location and/or purpose of the customization.

In some embodiments, these rules can be specific to one or several customizations and/or pieces of content. In one embodiment, for example, the rules can specify an evaluation of any potential content and/or customization before allowing the inclusion of this potential content and/or customization to be used in the document and/or page. This evaluation can include an evaluation of the content and/or customization and any therewith associated code for malicious and/or undesired functions or functionalities, evaluation of the content and/or customization to determine compatibility between the document and/or page and the content and/or customization, evaluation of the content and/or customization to determine compatibility between the content and/or customization and any other content and/or customizations that may be and/or have been applied to the document and/or page, or the like.

The results of this evaluation can be used to generate a rule of whether to include a customization and/or content. In some embodiments, this rule can be generated via the assignment of a first Boolean value indicative of a "true" condition corresponding to the allowability of including the content and/or the customization within the document and/or page to content and/or a customization if it is determined that the content and/or customization is non-malicious and/or has the desired compatibility. Likewise, in some embodiments, this rule can be generated via the assignment of a second Boolean value indicative of a "false" condition corresponding to the non-allowability of including the content and/or customization within the document and/or page to content and/or a customization if it is determined that the content and/or the customization is malicious and/or does not have the desired compatibility. This Boolean value can be stored in the convention database 309.

In addition to the illustrative databases described above, database server(s) 104 may include one or more external data aggregators 310. External data aggregators 310 may include third-party data sources accessible to the content management network 100, but not maintained by the content management network 100. External data aggregators 310 may include any electronic information source relating to the users, content resources, or applications of the content distribution network 100. For example, external data aggregators 310 may be third-party databases containing demographic data, education related data, consumer sales data, health related data, and the like. Illustrative external data aggregators 310 may include, for example, social networking web servers, public records databases, learning management systems, educational institution servers, business servers, consumer sales databases, medical record databases, etc. Data retrieved from various external data aggregators 310 may be used to verify and update user account information, suggest user content, and perform user and content evaluations.

Figure 4:
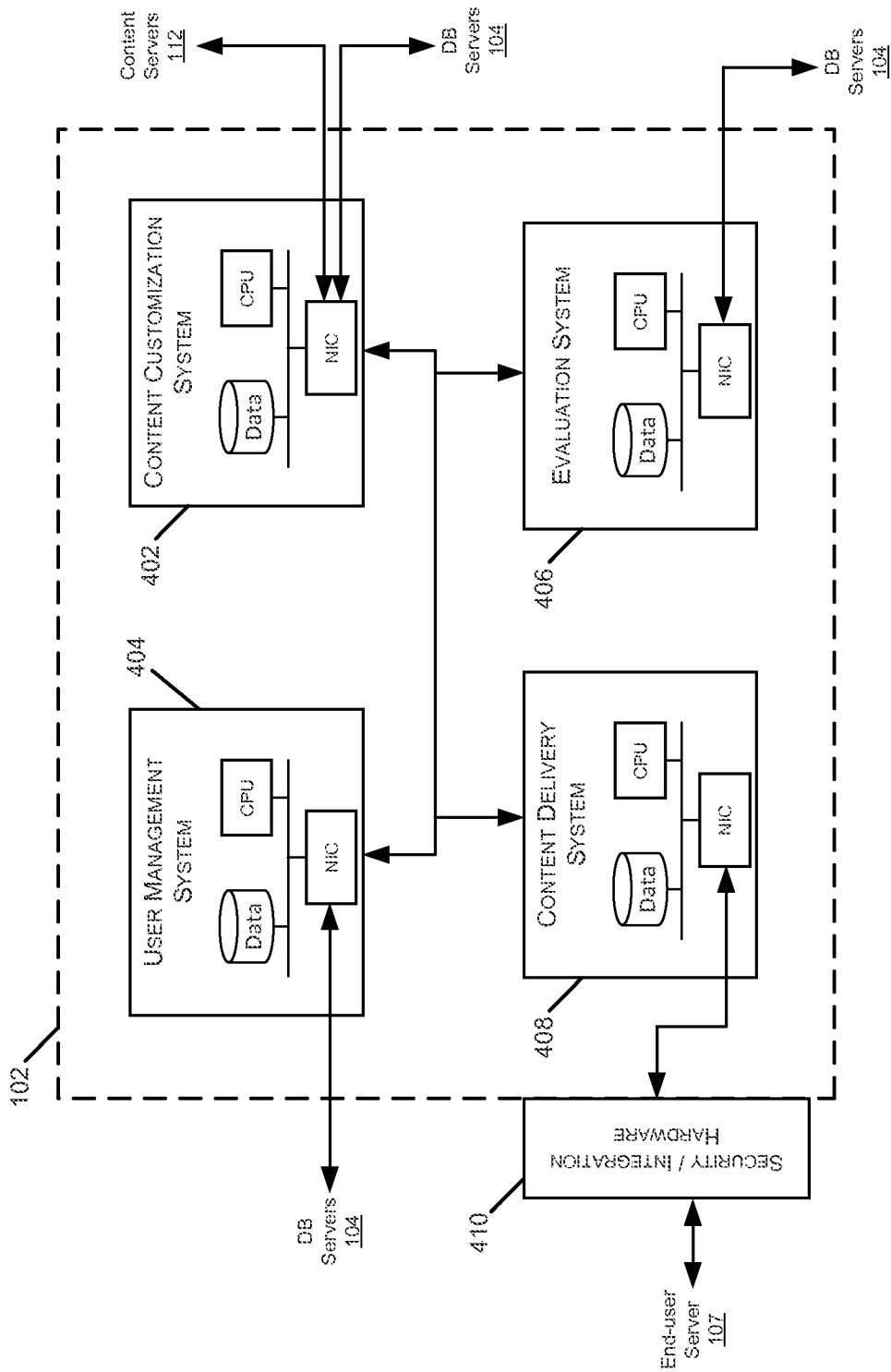
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), and the like. Based on the retrieved information from databases 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106 via, for example, the end-user server 107. For example, various ratings of content resources submitted by users may be compiled and analyzed, and then stored in a database (e.g., a content library database 303 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
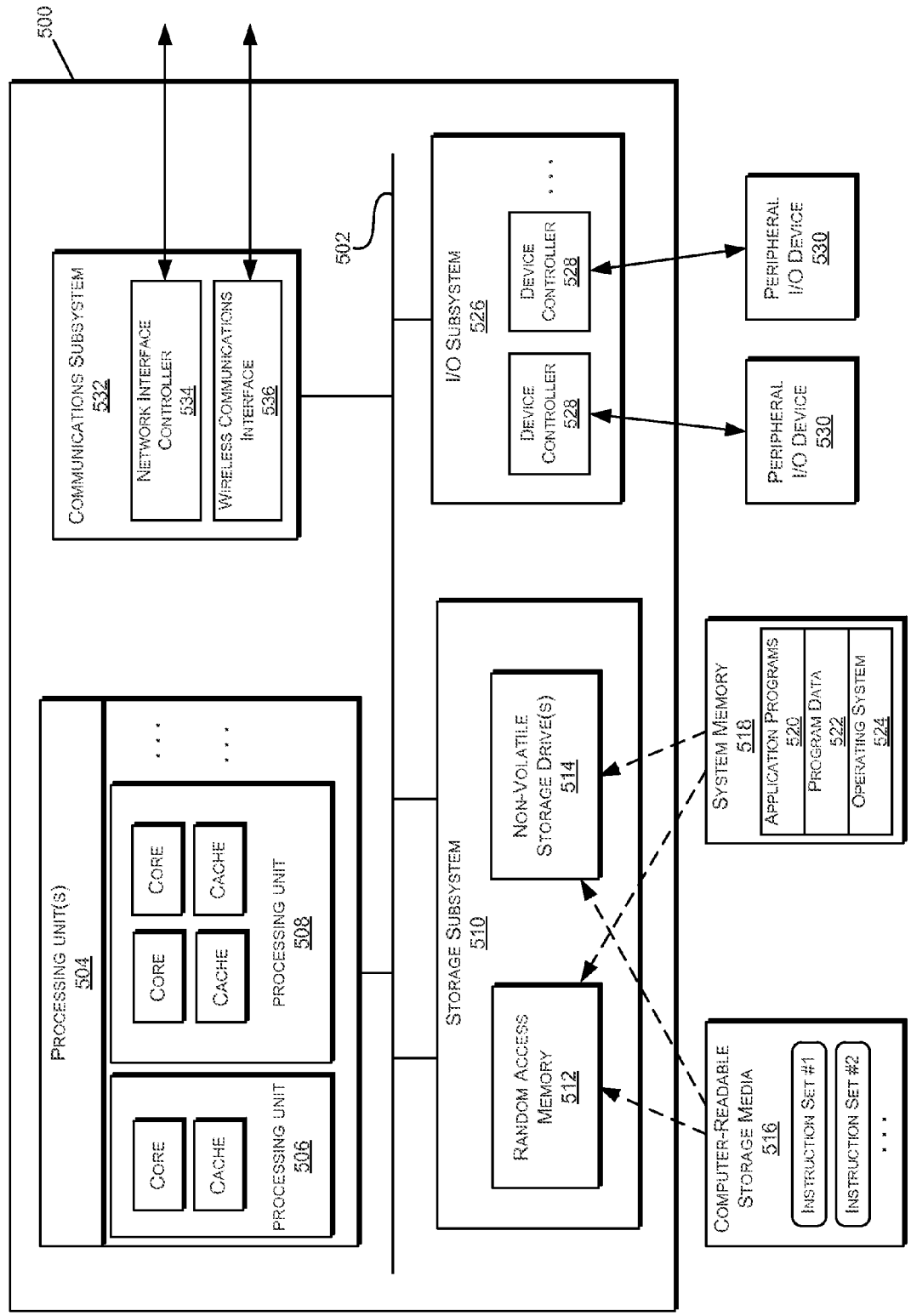
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
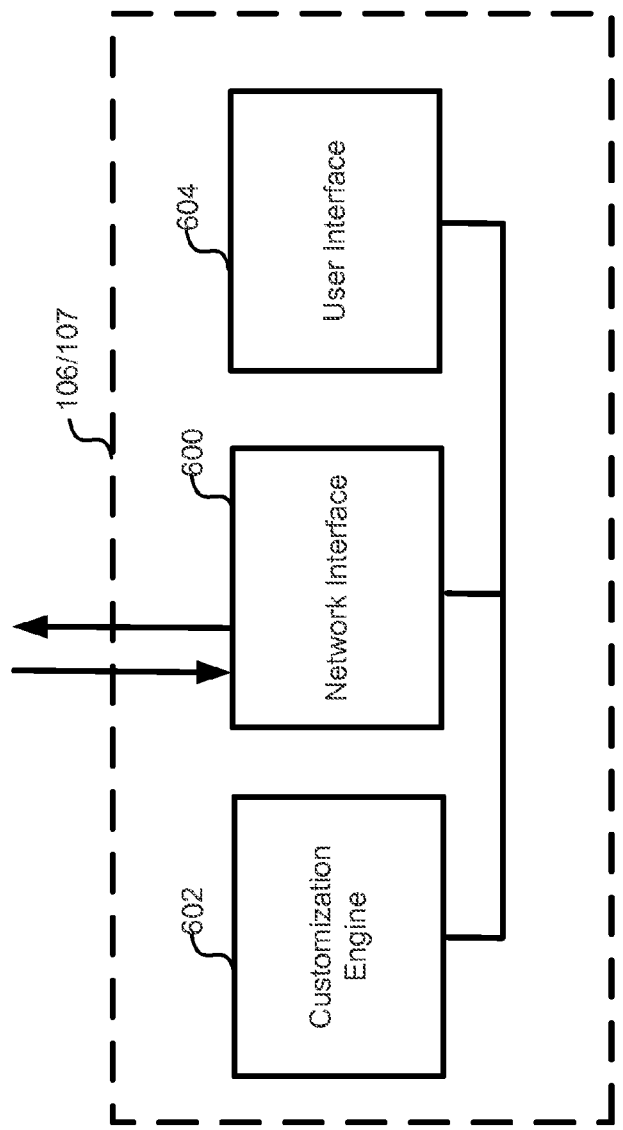
FIG. 6 is a schematic illustration of one embodiment of a user device for use with a content distribution network.

With reference now to FIG. 6, a block diagram of one embodiment of the end-user server 107 and/or the user device 106 is shown. As discussed above, the end-user server 107 and/or the user device 106 can be configured to provide information to and/or receive information from other components of the content delivery network 100. The end-user server 107 and/or the user device can 106 access the content delivery network 100 through any desired means or technology, including, for example, a webpage such as, for example, a social network service page, or a web portal. As depicted in FIG. 6, the end-user server 107 and/or the user device 106 can include a network interface 600. The network interface 600 allows the end-user server 107 and/or user device 106 to access the other components of the content delivery network 100. The network interface 600 can include features configured to send and receive information, including, for example, an antenna, a modem, a transmitter, receiver, or any other feature that can send and receive information. The network interface 600 can communicate via telephone, cable, fiber-optic, or any other wired communication network. In some embodiments, the network interface 600 can communicate via cellular networks, WLAN networks, or any other wireless network.

The end-user server 107 and/or the user device 106 can include, for example, a customization engine 602. The customization engine 602 can facilitate the creation of customizing content and/or the customization of one or several documents. The customization engine can include software that can be used to create the customizing content, such as, for example, word processing software, drawing software, graphical design software, or any other software that can be used to create content.

The end-user server 107 and/or the user device 106 can include a user interface 604 that communicates information to, and receives inputs from, a user. The user interface 604 can include a screen, a speaker, a monitor, a keyboard, a microphone, a mouse, a touchpad, a keypad, a touchscreen, or any other feature or features that can receive inputs from a user and provide information to a user.

Figure 7:
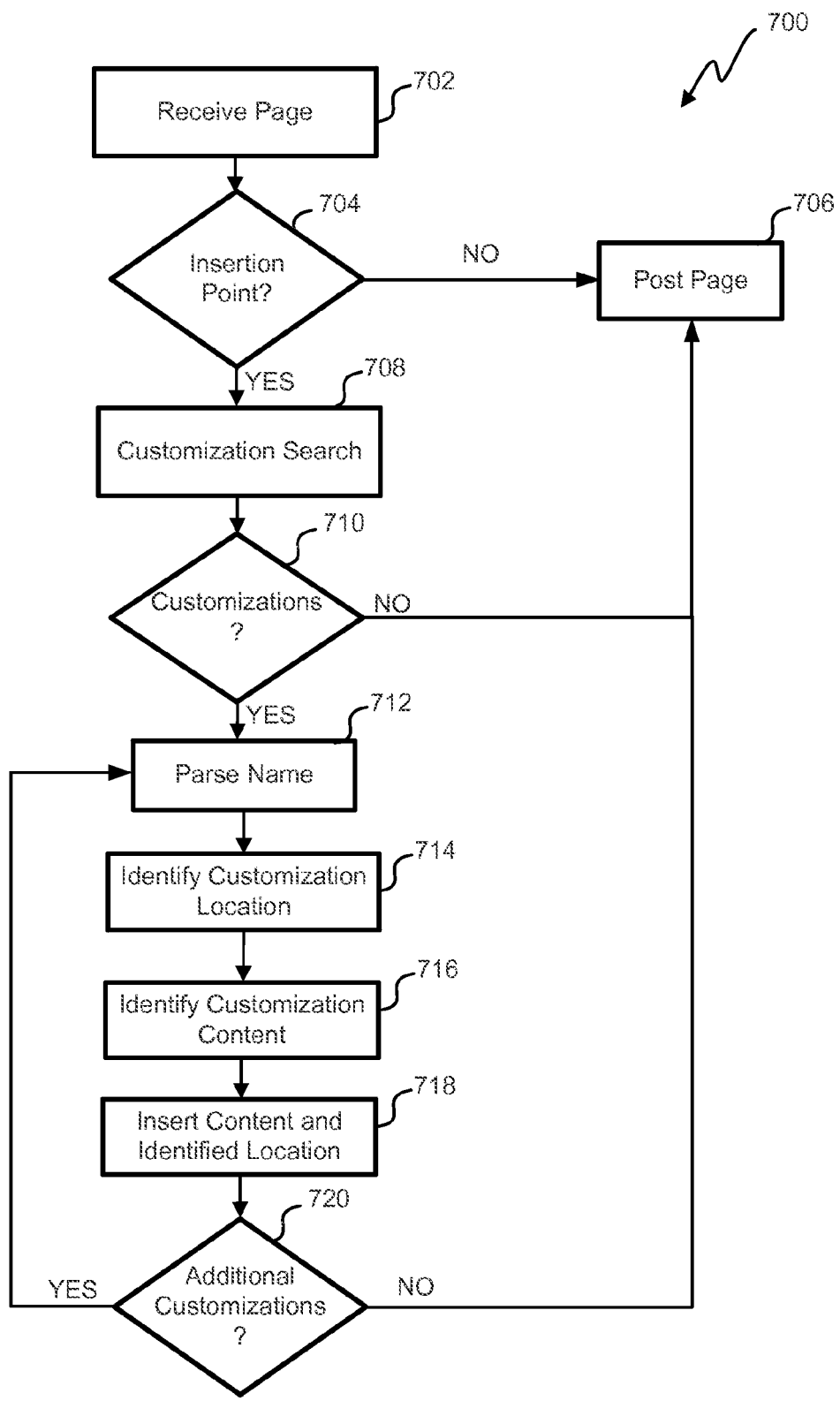
FIG. 7 is a flowchart illustrating one embodiment of a process for injecting content into a document.

With reference now to FIG. 7, a flowchart illustrating one embodiment of a process 700 for injecting content into a document is shown. The process 700 can be performed by the content distribution network 100 and/or a component thereof. In some embodiments, the process 700 can be performed on one of the end-user server 107 and/or one of the user devices 106 using information retrieved from other components of the content distribution network 100.

The process 700 begins at block 702 wherein a document, including, for example, a page such as a web-page, is received. In some embodiments, the document can be received by the user device 106 from the content network 122, including, for example, from the database server 104 of the content network 122 and/or from the local data server 109. In some embodiments, the document can be received by the user device 106 from, for example, the content library database 303. In some embodiments, the document can be received from the content network 122, and can be retrieved via a communication network such as, for example, the internet, a telephone network, a cellular network, or the like. In some embodiments, the document can include the document source code.

In some embodiments, receiving the document as described in block 702 can include, for example, the login of the user, including the receipt of login information and the verification of that login information. This login can be performed by the end-user server 107 and/or by the content network 122. Receiving the document can further include the requesting of a document and/or page. In some embodiments, this request can include a query sent from the end-user server 107 to the local data server 109 for retrieval of the document and/or page, and in some embodiments, this can include a query sent from the end-user server 107 to a component of the content network 122. In some embodiments, and in response to a query for the document, the recipient of the query can identify and/or locate the identified document, and/or can provide the identified document to the end-user server 107.

After the document has been received, the process 700 proceeds to decision state 704 wherein it is determined if the document contains an insertion point. In some embodiments, an insertion point can be a portion of a document that facilitates the insertion of content into the document. In some embodiments, the insertion point can be a physical point in or on the document, and in some embodiments, the insertion point can be code such as software code contained within the document that allows for insertion of content into the document. In one embodiment, an insertion point can be located in a header and/or at the top of the page, or in a footer and/or at the bottom of each page. A detailed description of one embodiment of the steps of decision state 704 is provided below with respect to FIG. 8.

In some embodiments, the determination of whether a document contains an insertion point can be performed by a component of the content distribution network 100 including, for example, the end-user server 107 and/or one of the user devices 106. If it is determined that the document does not contain the insertion page, the process 700 proceeds to block 706 wherein the document is published, which can include, for example, posting of the document online. In some embodiments, this publishing can include, for example, the adding of the document and/or page can be stored to the post database 308, which can be, for example, located in the local data server and/or in the content network 122. After the document and/or page has been stored in the post database 308, the document and/or page can be provided to one or several users via user devices 106 and/or via one or several supervisor devices 110.

If it is determined that the document contains an insertion point, then the process 700 proceeds to block 708 wherein a customization search is performed. In some embodiments, the customization search can include searching the local data server 109 including, for example, the customization database 307 for customization information. In some embodiments, this can include querying the customization database 307 for information identifying the contents of the customization database 307. Further detail relating to the customization search is provided below with respect to FIG. 9.

After the customization search has been performed, the process 700 proceeds to decision state 710 wherein it is determined if there are any customizations. In some embodiments, this can include determining whether there are any customizations that are applicable to the document. In some embodiments, this can include filtering customizations according to one or several criteria such as, for example, authorship, document applicability, length, level of review, or the like. If it is determined that there are no customizations for the current document, then the process 700 returns to block 706 wherein the document is published.

If it is determined that there are customizations for the current document, then the process 700 proceeds to block 712 wherein the name of the customization is parsed. In some embodiments, the parsing of the name can encompass the extraction of information relating to the customization from any source. In some embodiments, this information relating to the customization can include, for example, the document to which the customization is applicable, the document page to which the customization is applicable, the location on the page to which the customization is applicable, including, for example, the insertion point to which the customization is applicable, the creator of the customization, and/or the like.

In some embodiments, the name of the customization can be parsed by, for example, the customization engine 602 of the end-user server 107 and/or the user device 106 or other component of the content distribution network 100. In some embodiments, the name of the customization can be parsed according to one or several rules or conventions stored within the convention database 309. In some embodiments, the name of the customization can be parsed so as to determine aspects of the customization such as, for example, the document to which the customization is applicable, the author of the customization, and/or the intended insertion point and/or location of the document for the customization.

In some embodiments, the customization name can include a first portion that identifies the customization. In some embodiments, this first portion can identify a plurality of documents associated with and/or used in the customization. In one embodiment, for example, in which the customization content is separately stored from metadata identifying the location for insertion of the customization into the document, the first portion of the name of both of the customization content and the metadata identifying the location for insertion of the customization into the document can be the same so as to allow a determination of the relatedness of the customization content and the metadata identifying the location for insertion of the customization into the document.

In some embodiments, the customization name can include a second portion that can specify one or several intended insertion points within the document. In some embodiments, these one or several intended insertion points can indicate the intended placement and/or approximate intended placement of the customization within the document. In some embodiments, the name of the customization can be parsed to separate the first and second portions of the customization name so as to thereby determine any related and/or associated customization information and the insertion point relevant to the customization.

After the name has been parsed, the process 700 proceeds to block 714 wherein the customization location is determined. In some embodiments, this can include determination of the insertion point identified in the customization name, and in some embodiments, this can include determination of an exact location for the customization as specified by metadata associated with the customization content. In some embodiments, this exact location specified by metadata associated with the customization content can be a destination location. The destination location can the location at which the customization appears to a user when the user is accessing the document/page containing the customization. In some embodiments, this destination location can be within and/or at the insertion point, and in other embodiments, the destination location can be at a location within the page other than at the insertion point. However, regardless of whether the customization appears to the user outside of the insertion point, the customization can, in some embodiments, be inserted into the document/page at the insertion point.

In some embodiments, this can include using information from the parsed name to identify any other information relevant to the customization, identifying any metadata specifying an intended location for the customization, and determining the intended location based on the metadata. This identification of the location for receiving the customization can be performed by components of the content delivery network 100 such as, for example, end-user server 107 and/or the user device 106 or component thereof.

After the customization location has been identified, the process 700 proceeds block 716 wherein customization content is identified. In some embodiments, for example, this can include determining the content to be included in the document. In some embodiments, this can include identifying one or several files from the customization database 307, which files contain customization content. In some embodiments, this can further include identifying one or several customization files associated with the customization based on information extracted from the parsed name and retrieving those one or several customization files. In some embodiments, the customization content can comprise source code. In some embodiments, this step can be performed by a component of the content delivery network 100 such as, for example, end-user server 107 and/or one or several of the user devices 106.

After the customization content has been identified, the process 700 proceeds to block 718 wherein the customization content is inserted at the identified location. In some embodiments, this can include inserting source code for the customization content into the source code of the document at the determined insertion point. In some embodiments, this modification of the document can be stored in the local data server 109, and specifically in a database located on the local data server 109 such as, for example, the post database 308.

After the customization content has been inserted into the document, the process 700 proceeds to decision state 720 wherein it is determined if there are any additional customizations, including, for example, if there are any additional applicable customizations. In some embodiments, this determination is made by end-user server 107 or one of the user devices 106 based on information received in block 708. If it is determined that there are additional customizations, then the process returns to block 702 and proceeds as outlined above. If it is determined there are no additional customizations, then the process 700 proceeds to block 706 wherein the document is published, which can include, for example, posting of the document online.

Figure 8:
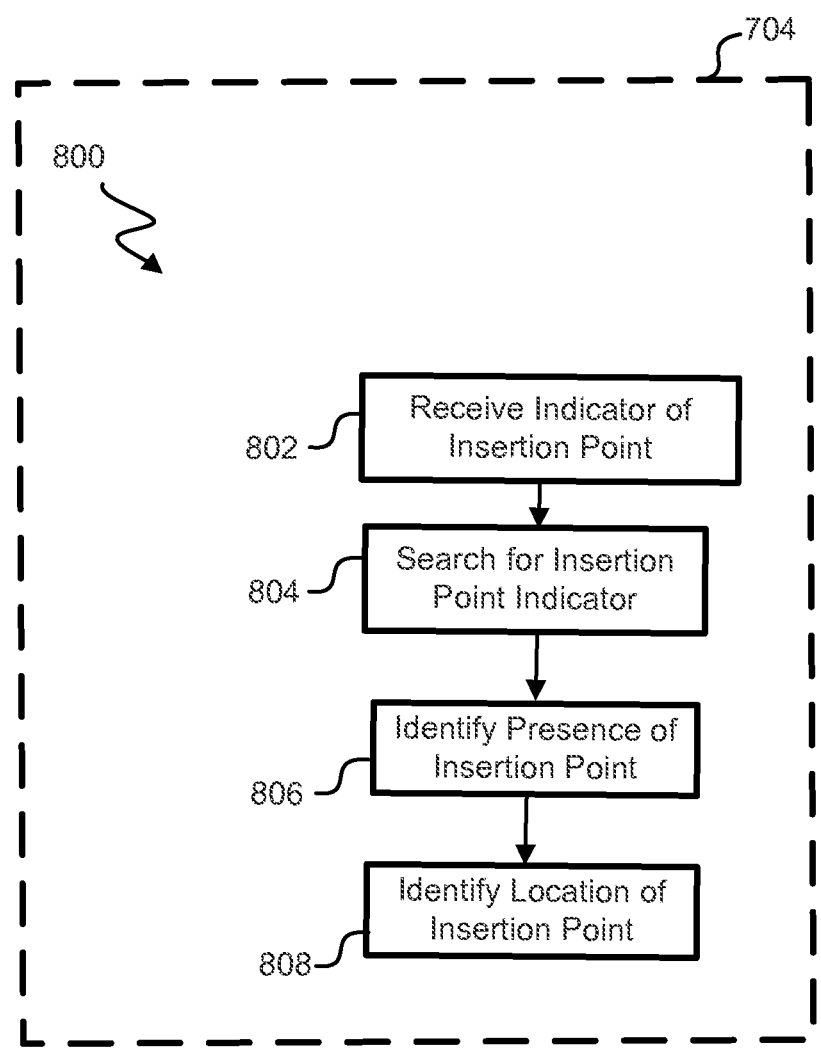
FIG. 8 is a flowchart illustrating one embodiment of a process for identifying the presence of an insertion point.

With reference now to FIG. 8, a flowchart illustrating one embodiment of a process 800 for identifying the presence of an insertion point is shown. This process 800 can be performed as a part of decision state 704 of FIG. 7, and/or in the place of decision state 704 of FIG. 7. The process 800 begins at block 802, wherein the type of coding indicative of an insertion point and/or creating an insertion point is identified. In some embodiments, this type of coding can be one or several lines of code used to create the insertion point, a coding format unique and/or partially unique to the insertion point, an indicator of the insertion point such as, for example, a value, text, and/or a text string indicative of the insertion point, or the like. In some embodiments, information identifying the type of code indicative of an insertion point can be retrieved from the convention database 309, which database can be stored in, for example, the local data server 109 and/or a component of the content network 122. Accordingly, as the convention database 309 may be stored remote from the end-user network 105 in, for example, the content network 122, the information identifying the type of code and/or coding indicative of the insertion point can be requested and received via a communication network in the form of one or several electrical signals.

After the type of coding indicative of the insertion point is identified, the process 800 proceeds to block 804, wherein the received page and/or document is searched for the presence of coding indicative of the insertion point. This searching can be performed by a computing device using a search engine and/or search algorithm. In some embodiments, this can include a search of the received page and/or document for the type of coding identified in block 802.

After the received page and/or document is searched for the presence of coding indicative of the insertion point, the process 800 proceeds to block 806, wherein a Boolean value is associated with the received page and/or document. In some embodiments, for example, a first Boolean value corresponding to "true" can be associated with the received page and/or document if coding indicative of the insertion point is identified in the document and/or page, and a second Boolean value corresponding to "false" can be associated with the received page and/or document if coding indicative of the insertion point is not identified in the document and/or page. In some embodiments, this Boolean value can be associated with the page and/or document and can be stored in, for example, the local data server 109 and/or a component of the content network 122, and specifically, in some embodiments, this Boolean value can be stored in a database such as, for example, the content library database.

After the Boolean value is associated with the received page, the process 800 proceeds to block 808, wherein a value and/or text string is generated identifying the location of the insertion point within the document and/or page. In some embodiments, this position can include, for example, at the header, the footer, the right margin, the left margin, and/or any other desired position. In some embodiments, a portion of a value and/or text string can be unique so as to identify the position of the insertion portion within the page. These values and/or text strings can be stored in a database such as, for example, the content library database 303 which can be stored in, for example, the local data server 109 and/or in the content network 122.

Figure 9:
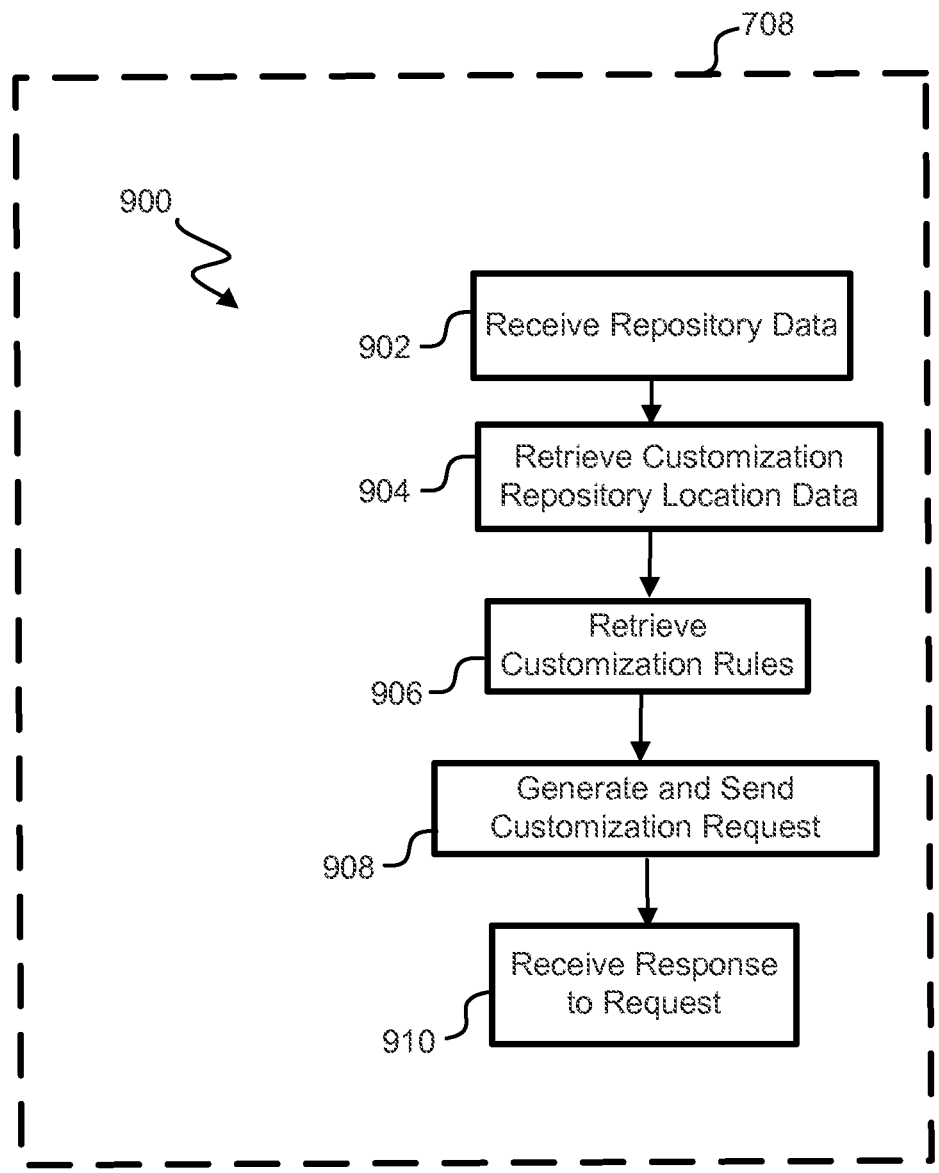
FIG. 9 is a flowchart illustrating one embodiment of a process for performing a customization search.

FIG. 9 is a flowchart illustrating one embodiment of a process 900 for performing a customization search. In some embodiments, the process 900 can be performed as a part of the customization search of block 708 of FIG. 7 discussed above, and in some embodiments, the process 900 can be performed in the place of the customization search of block 708 of FIG. 7 above. The process 900 begins at block 902, wherein data identifying one or several customization repositories is retrieved. In some embodiments, this data can identify, for example, the server and/or server portion containing one or several customizations, the network containing one or several servers containing customizations, or the like. In some embodiments, for example, networks containing one or several servers containing one or several customizations can include one or several of the end-user network 105, the content network 122, and one or several of the customizer networks.

The data identifying one or several customization repositories can be retrieved from the convention database 309. This data can identify one or several sources of customizations and/or content. In some embodiments, this can include identifying one or several servers from which content and/or one or several customizations can be retrieved, and/or identifying one or several networks from which content and/or one or several customizations can be retrieved.

After the data identifying one or several customization repositories has been retrieved, the process 900 proceeds to block 904, wherein data identifying the location of these customization repositories is retrieved. In some embodiments, this information can identify whether some or all of the customization repositories are local in that they are located within the end-user network 105 and/or remote in that they are located outside of the end-user network 105.

After the location of the customization repositories has been identified, the process 900 proceeds to block 906, wherein customization rules are retrieved. In some embodiments, these customization rules can identify which content and/or customizations can be applied to a document and/or page including, for example, categories of content and/or customizations that are applicable to the document/page, and/or how content and/or customizations can be applied to a document and/or page. In some embodiments, these customization rules can be retrieved from, for example, the convention database 309 which can be located in the local data server 109 and/or in a component of the content network 122.

After the customization rules having been retrieved, the process 900 proceeds to block 908, wherein a customization request is generated and sent. In some embodiments, the generation of the customization request can include the generation of the portions of the name that would identify a customization as for use with the document and/or page. In some embodiments, this can include the retrieval of the naming convention for customizations from the convention database 309, retrieving information to be used to generate the name portion according to the naming convention, and applying the naming convention to the information to be used to generate the name portion. After the portion of the name has been generated, the portion of the name can be inserted into a request and sent to one or several servers identified as potential sources of customizations. These servers can then use the request and the portion of the name to search for customizations applicable to the document and/or page.

After the customization request has been generated and sent, the process 900 proceeds to block 910, wherein a response is received. In some embodiments, this response can be received by the end-user server 107 from one of the data servers of the content distribution network 100. In some embodiments, this response can include a value and/or text string indicating whether a customization was identified, and in some embodiments, the response can contain any identified customization.

Figure 10:
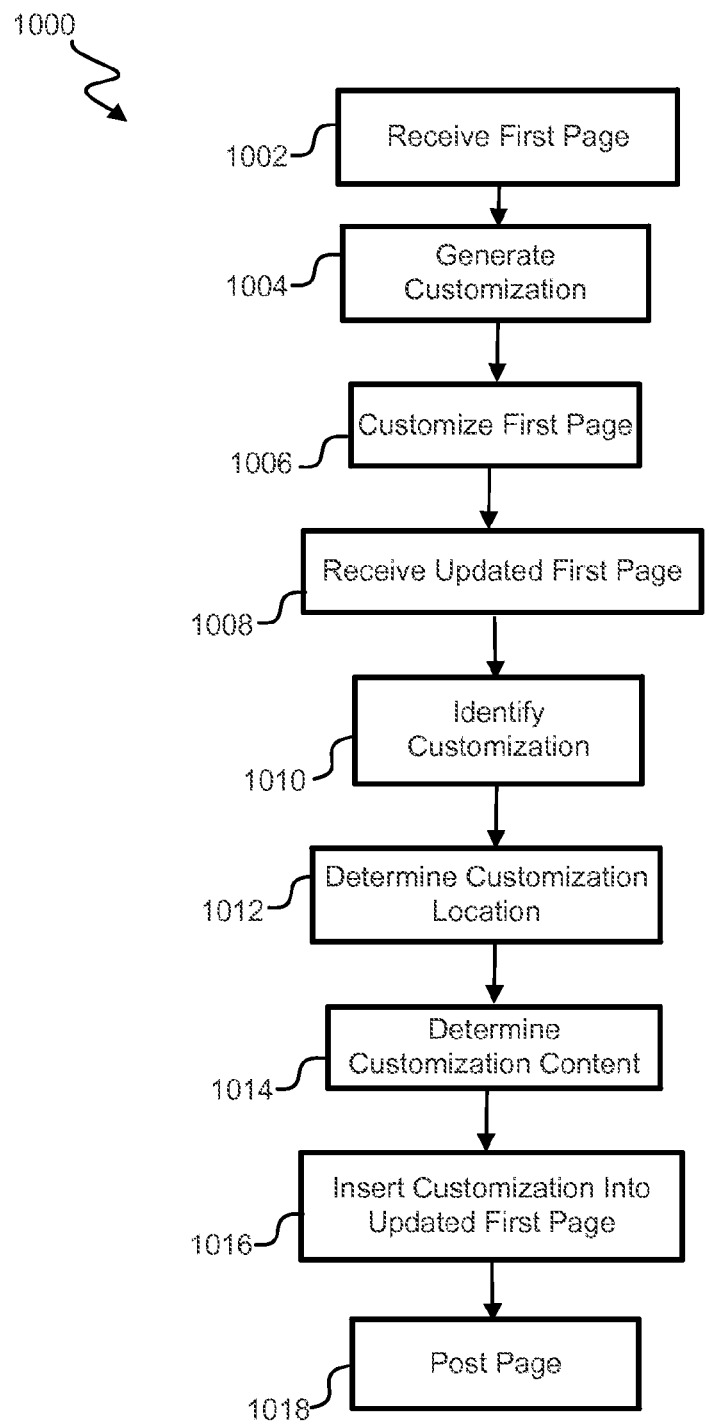
FIG. 10 is a flowchart illustrating one embodiment of a process for automatic content injection into a new document.

With reference now to FIG. 10, a flowchart illustrating one embodiment of a process 1000 for automatic content injection into a new document is shown. In some embodiments, this process 1000 can be performed to automatically update one or several documents; the process can be performed by, for example, the processor 102 of the content distribution network 100 and/or one or several of the user devices 106.

The process 1000 begins at block 1002 wherein a first document is received. In some embodiments, the first document can be received by the user device 106 from one of the database servers 104 such as, for example, from the content library database 303. In some embodiments, the first document can be received from the content network 122. In some embodiments, the first document can include the document source code.

After the document has been received, the process 1000 proceeds to block 1004 wherein the customization is generated. In some embodiments, the generation of the customization can include, for example, the authorship of customization content by a user using the customization engine 602 of the user device 106. In some embodiments, the customization can be stored within one of the database servers 104 such as, for example, the customization database 307.

After the customizations have been generated, the process proceeds to block 1006 wherein the first document is customized. In some embodiments, the customization of the first document can include the steps of process 700 discussed in FIG. 7. Specifically, in some embodiments, customization of the first document can include insertion of the generated customization into the first document.

After the first document is customized, the process 1000 proceeds to block 1008 wherein an updated first document is received. In some embodiments, the updated first document is a replacement document for the first document and includes more or less information than the first document. In some embodiments, the updated first document can be received by the content distribution network 100 from the content network 122.

After the updated first page has been received, the process 1000 proceeds to block 1010 wherein the customization is identified. In some embodiments, identification of the customization can include searching one of the database servers 104 such as, for example, the customization database 307, for customization information. In some embodiments, the customization is identified as the customization generated in block 1004 and applied to the first document in block 1006. In some embodiments, the identification of the customization can include the identification of the one or several customizations used in the first page and/or document, and then searching for those customizations used in the first page or document.

After the customization has been identified, the process 1000 proceeds to block 1012 wherein the customization location is determined. In some embodiments, this can include determining the location within the update of the first document at which the customization is intended to be placed. In some embodiments, this determination can be performed according to steps outlined in process 700 of FIG. 7.

After the customization location has been determined, the process 1000 proceeds to block 1014 wherein the customization content is determined. In some embodiments, this can include, for example, identifying one or several files containing the customization content, or identifying source code of the customization content, and/or the like. After the customization content has been determined, the process 1000 proceeds to block 1016 wherein the customization is inserted into the updated first page. In some embodiments, this insertion can be at a location specified in the customization name and/or metadata associated with the customization content. In some embodiments, the insertion of the customization into the updated first page can be performed according to block 712 through 718 of process 700 shown in FIG. 7. After the customization has been inserted into the updated first page, the process 1000 proceeds to block 1018 wherein the document is published, which can include, for example, posting of the document online. In some embodiments, after the page has been published in block 1018, an additional updated first page can be received such as, for example, when a new version of a webpage is released. In such an embodiment, the process 1000 can return to block 1008 and proceed as outlined above.

Figure 11:
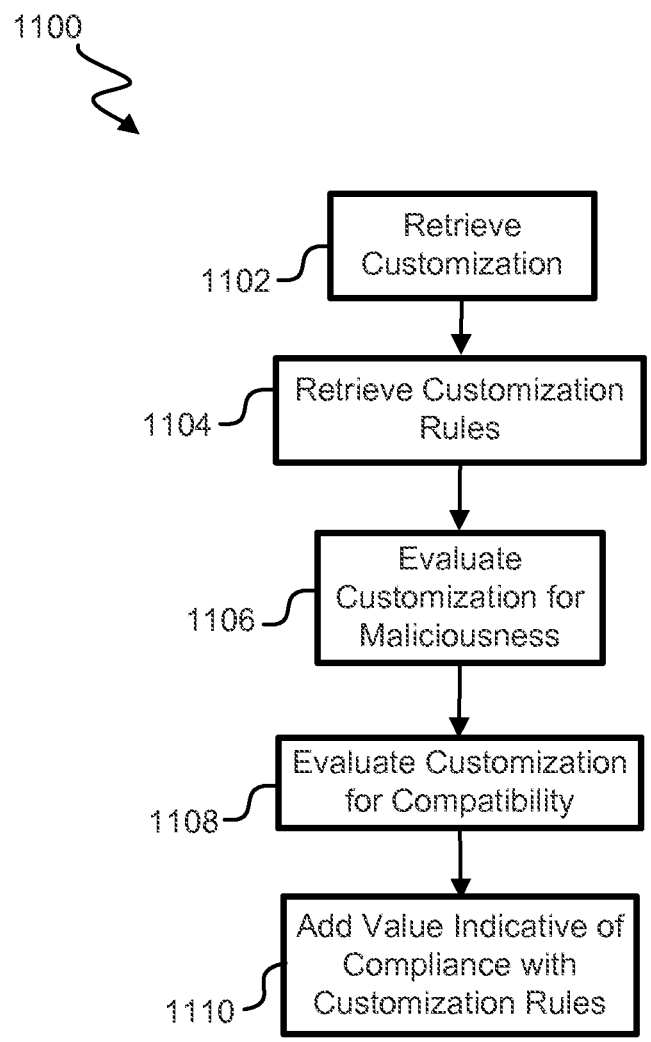
FIG. 11 is a flowchart illustrating one embodiment of a process for determining customization rule compliance.

With reference now to FIG. 11, a flowchart illustrating one embodiment of a process 1100 for determining customization rule compliance is shown. The process 1100 can be performed additional to the process 700 shown in FIG. 7. The process 1100 begins at block 1102, wherein a customization is retrieved. In some embodiments, the customization can be retrieved from the customization database 307 which can be, for example, stored in the local data server 109, in the content network 122, and/or in one or several customizer networks 124.

After the customization has been retrieved, the process 1100 proceeds to block 1104, wherein one or several customization rules are retrieved from the convention database 309. The customization rules relate to use of content and/or customizations can include rules identifying one or several acceptable content and/or customization types, sizes, formats, coding, or the like. In some embodiments, these customization rules can further relate to identifying a customization as either malicious or non-malicious, and in some embodiments, can comprise a database of functionalities identified as malicious and/or a database identifying malicious code, scripts, or the like. In some embodiments, for example, a malicious functionality can include, some or all data collection functionalities, security breaching functionality, privacy limiting functionality, functionality affecting program operation, or the like.

After the customization rules are retrieved from the convention database 309, the process 1100 proceeds to block 1106, wherein the customization is evaluated for malicious content. In such an evaluation, the customization is evaluated for the existence of one or more malicious functionalities and/or for the existence of one or more malicious codes, scripts, or the like in the customization. In some embodiments, this evaluation can be performed on the code of the customization, and in some embodiments, the evaluation can be a functional evaluation based on performance of the customization when in use. In such embodiments in which the evaluation is a functional evaluation based on performance of the customization when in use, the customization can be implemented in a sandbox environment so as to contain any damage and limit any risk if the customization is malicious.

In some embodiments, after the customization has been evaluated to determine if it is malicious, a Boolean value can be associated with the customization and indicate if the customization is malicious. In such an embodiment, a first Boolean value indicative of a "true" condition can be associated with the customization if it is determined that the customization is non-malicious and/or does not contain malicious content and/or functionalities, and a second Boolean value indicative of a "false" condition can be associated with the customization if it is determined that the customization is malicious and/or contains malicious content and/or functionalities. These Boolean values can be associated with the customization and can be stored in the customization database 307, which can be located in the local data server 109 of the end-user network 105 and/or in the content network 122.

In some embodiments in which a customization is identified as malicious and/or containing malicious content and/or functionality, a message can be generated by one of the components of one of the end-user networks 105 or the content network 122 and can be sent to the customizer network 124 that is the source of the customization. In some embodiments, this message can identify the one or several triggers of the "malicious" classification of the customization, contain a warning about consequences of repeatedly providing malicious customizations, and/or provide one or more potential fixes to the customization. In some embodiments, a count associated with the customizer network 124 source of the malicious customization can be implemented and compared to a threshold value. In some embodiments, a customization rule in the convention database 309 can be updated to reflect this count, and particularly to prohibit the use of customizations from the customizer network 124 that is the source of the malicious customization if the count is greater than the threshold.

After the customization has been evaluated to determine if it is malicious and/or contains malicious content and/or functionality, the process 1100 proceeds to block 1108, wherein the customization is evaluated for compatibility. In some embodiments, this evaluation can be general to determine if the customization is compatible with the document/page that it is intended to customize, and in some embodiments, this evaluation can be specific to determine if the customization is compatible with other customizations already in and/or intended to be used in the document/page. In some embodiments, this evaluation can include determining whether the customization detrimentally affects the operation and/or functioning of the document/page and/or other customizations within the document/page and/or customizations to be placed within the document/page. In some embodiments, if the customization does not detrimentally affect the operation and/or functioning of the document/page and/or other customizations within the document/page and/or customizations to be placed within the document/page, the customization is identified as compatible, and alternatively, if the customization detrimentally affects the operation and/or functioning of the document/page and/or other customizations within the document/page and/or customizations to be placed within the document/page, the customization is identified as non-compatible.

Further, in some embodiments the degree to which the customization detrimentally affects the operation and/or function of the document/page and/or other customizations within the document/page and/or customizations to be placed within the document/page can be used to determine compatibility. In such an embodiment, when it is determined that the customization detrimentally affects the operation and/or functioning of the document/page and/or other customizations within the document/page and/or customizations to be placed within the document/page, the degree of effect can be determined and compared to a threshold value. In some embodiments, if the degree of effect does not exceed the threshold value, then customization can be identified as compatible, and if the degree of effect exceeds the threshold value, then the customization can be identified as non-compatible.

In some embodiments, a first Boolean value indicative of a "true" condition can be associated with the customization if it is determined that the customization is compatible and a second Boolean value indicative of a "false" condition can be associated with the customization if it is determined that the customization is non-compatible. These Boolean values can be associated with the customization and can be stored in the customization database 307, which can be located in the local data server 109 of the end-user network 105 and/or in the content network 122.

In some embodiments in which a customization is identified as non-compatible, a message can be generated by one of the components of one of the end-user networks 105 or the content network 122 and can be sent to the customizer network 124 that is the source of the customization. This message can include information identifying the circumstance giving rise to the incompatibility and the effect of the incompatibility. In some embodiments, this can further include information relating to one or several potential compatibility fixes.

In some embodiments, a count associated with the customizer network 124 source of the non-compatible customization can be implemented and compared to a threshold value. In some embodiments, a customization rule in the convention database 309 can be updated to reflect this count, and particularly to prohibit the use of customizations from the customizer network 124 that is the source of the non-compatible customization if the count is greater than the threshold.

After the customization has been evaluated for compatibility, the process 1100 proceeds to block 1110 wherein a value indicative of the compliance or non-compliance of the customization with the customization rules is associated with the customization. In some embodiments, this value can be generated based on the Boolean values associated with the customization above and relating to the maliciousness and/or compatibility of the customization. These values can be stored in, for example, the customization database 307, which can be located in the local data server 109 and/or in a component of the content network 122.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of injecting content into a document comprising:
  retrieving a document comprising digital content via a communication network;
  identifying a presence of at least one insertion point within the document, wherein identifying the presence of the at least one insertion point within the document comprises:
    receiving data identifying one or several indicators of an insertion point; and
    searching the document via a search engine for indicators of the insertion point;
  identifying a customization, wherein the customization comprises a metadata file, a customization file comprising at least one page fragment for insertion into the document, and a customization name;
  parsing the customization name;
  determining a customization location from the parsing of the customization name, wherein determining the customization location comprises:
    identifying a designated insertion point for receiving the customization; and
    identifying a destination location in displayed digital content for the customization, wherein the destination location is the location at which the customization appears to a user accessing the document, and wherein the destination location is not at the insertion point;
  inserting the customization into the document at the insertion point; and
  outputting the document including the inserted customization to a user via a display.

2. The method of claim 1, wherein receiving data identifying one or several indicators of the insertion point comprises receiving an electrical signal containing information identifying coding creating an insertion point, wherein the electrical signal is received at an end-user server of an end-user network from a content network.

3. The method of claim 2, wherein identifying the presence of the at least one insertion point within the document further comprises associating a first Boolean value indicative of having found at least one insertion point in the document if the search engine identifies coding creating at least one insertion point within the document and associating a second Boolean value indicative of not having found at least one insertion point in the document if the search engine does not identify coding creating at least one insertion point.

4. The method of claim 3, further comprising searching for a customization.

5. The method of claim 4, wherein searching for the customization comprises retrieving data identifying a plurality of customization repositories, wherein at least one of the customization repositories is part of the end-user network and at least one of the customization repositories is outside of the end-user network but communicatively connected with the end-user network.

6. The method of claim 5, wherein searching for the customization comprises retrieving customization rules, wherein the customization rules identify categories of customizations applicable to the document.

7. The method of claim 6, wherein searching for the customization comprises generating and sending a customization request.

8. The method of claim 7, wherein generating and sending a customization request comprises generating a portion of a customization name according to a naming convention, wherein the portion of the customization name identifies customization for the document.

9. The method of claim 8, wherein generating a portion of the customization name comprises:
  retrieving a naming convention from a convention database;
  retrieving information relating to the document for use in generating the portion of the customization name; and
  applying the naming convention to the information for use in generating the portion of the customization name to generate the portion of the customization name.

10. The method of claim 9, wherein the destination location is within the insertion point.

11. The method of claim 9, wherein the destination location is outside of the insertion point.

12. An end-user system comprising:
  a plurality of user devices, wherein each of the plurality of user devices is configured to display a document to a user;
  a local data server comprising a plurality of databases, wherein the plurality of databases comprise:
    a post database, wherein the post database contains the content that is displayed to a user via at least one of the user devices; and
    a customization database, wherein the customization database comprises at least one customization including a customization file comprising at least one page fragment for insertion into the document and a metadata file; and
  an end-user server configured to:
    retrieve a document comprising digital content via a communication network;
    identify the presence of at least one insertion point within the document, wherein identifying the presence of the at least one insertion point within the document comprises:
      receiving data identifying one or several indicators of an insertion point; and
      searching the document via a search engine for indicators of an insertion point;

identify a customization comprising a customization file comprising at least one page fragment for insertion into the document and a metadata file from the customization database, wherein the customization has a customization name;

parse the customization name;

determine a customization location, wherein determining the customization location comprises:
    identifying a designated insertion point for receiving the customization; and
    identifying a destination location in displayed digital content for the customization, wherein the destination location is the location at which the customization appears to a user accessing the document, and wherein the destination location is not at the insertion point;

insert the customization into the document at the insertion point; and output the document including the inserted customization to at least one of the user devices.

13. The system of claim 12, wherein the identified customization is one of the at least one customization in the customization database.

14. The system of claim 12, wherein the identified customization is not one of the at least one customization in the customization database.

15. The system of claim 12, wherein receiving data identifying one or several indicators of the insertion point comprises receiving an electrical signal containing information identifying coding creating an insertion point, wherein the electrical signal is received at an end-user server of an end-user network from a content network.

16. The system of claim 15, wherein identifying the presence of the at least one insertion point further comprises associating a first Boolean value indicative of having found at least one insertion point in the document if the search engine identifies coding creating at least one insertion point within the document and associating a second Boolean value indicative of not having found at least one insertion point in the document if the search engine does not identify coding creating at least one insertion point.

17. The system of claim 16, wherein identifying the presence of the at least one insertion point further comprises searching for a customization, wherein searching for the customization comprises retrieving data identifying a plurality of customization repositories, wherein at least one of the customization repositories is part of the end-user network and at least one of the customization repositories is outside of the end-user network but communicatively connected with the end-user network.

18. The system of claim 17, wherein searching for the customization comprises;
    retrieving customization rules, wherein the customization rules identify categories of customizations applicable to the document; and
    generating and sending a customization request.

19. The system of claim 18, wherein generating and sending a customization request comprises generating a portion of an expected customization name according to a naming convention, wherein the portion of the expected customization name identifies a customization for the document.

20. The system of claim 19, wherein generating a portion of the customization name comprises:
    retrieving a naming convention from a convention database;
    retrieving information relating to the document for use in generating the portion of the customization name; and
    applying the naming convention to the information for use in generating the portion of the customization name to generate the portion of the customization name.

\* \* \* \* \*